US006971091B1

(12) United States Patent
Arnold et al.

(10) Patent No.: US 6,971,091 B1
(45) Date of Patent: Nov. 29, 2005

(54) SYSTEM AND METHOD FOR ADAPTIVELY OPTIMIZING PROGRAM EXECUTION BY SAMPLING AT SELECTED PROGRAM POINTS

(75) Inventors: Matthew R. Arnold, Ridgefield Park, NJ (US); Stephen J. Fink, Yorktown Heights, NY (US); David P. Grove, Ridgefield, CT (US); Michael J. Hind, Cortlandt Manor, NY (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 09/703,316

(22) Filed: Nov. 1, 2000

(51) Int. Cl.$^7$ ................................................ G06F 9/45
(52) U.S. Cl. ...................... 717/145; 717/130; 717/140; 717/153; 718/1
(58) Field of Search ................................ 717/140, 153, 717/130, 145; 718/1

(56) References Cited

U.S. PATENT DOCUMENTS

| 5,995,754 | A | 11/1999 | Hölzle et al. | |
| 6,189,141 | B1 * | 2/2001 | Benitez et al. | 717/153 |
| 6,374,369 | B1 * | 4/2002 | O'Donnell | 714/38 |
| 6,397,379 | B1 * | 5/2002 | Yates et al. | 717/140 |
| 6,622,300 | B1 * | 9/2003 | Krishnaswamy et al. | 717/130 |
| 2002/0010913 | A1 * | 1/2002 | Ronstrom | 717/9 |

OTHER PUBLICATIONS

74. Arnold el al., "A Framework for Reducing the Cost of Instrumented Code", Rutgers University Technical Report DCS-TR-424, Nov. 2000.*

"Profile-Guided Receiver Class Prediction", by David Grove, et al., 1995 ACM 0-89791-703-0/95/0010, pp. 108-123.
"Adaptive Systems for the Drynamic RN-Time Optimization of Programs", Gilbert J. Hansen, National Technical Information Service, Mar. 1974, AD784880.
"System Support for Automatic Profiling and Optimization", by Xiaolan Zhang, et al., Division of Engineering and Applied Sciences, Harvard University, pp. 15-26.
"Digital FX!32: Combining Emulation and Binary Translation", by Raymond J. Hookway, et al., Digital Technical Journal, vol. 9, No. 1, 1997, pp. 2-13.
"Transparent Dynamic Optimization; The Design and Implementation of Dynamo" by Vasanth Bala, et al., Hewlett Packard, 1999, pp. 2-102.

(Continued)

Primary Examiner—Meng-Al T. An
Assistant Examiner—Andy Ho
(74) Attorney, Agent, or Firm—Scully, Scott, Murphy & Presser; Richard Lau, Esq.

(57) ABSTRACT

A sampling-based system and method for adaptively optimizing a computer program executing in an execution environment that comprises one or more compiler devices for providing various levels of program optimization. The system comprises a runtime measurements sub-system for monitoring execution of the computer program to be optimized, the monitoring including obtaining raw profile data samples and characterizing the raw profile data; a controller device for receiving the characterized raw profile data from the runtime measurements sub-system and analyzing the data for determining whether a level of program optimization for the executing program is to be performed by a compiler device, the controller generating a compilation plan in accordance with a determined level of optimization; and, a recompilation sub-system for receiving a compilation plan from the controller and invoking a compiler device for performing the level of program optimization of the executing program in accordance with the compilation plan.

54 Claims, 4 Drawing Sheets

OTHER PUBLICATIONS

"A General Approach for Run-Time Specialization and its Application to C", by Charles Consel, et al., 1996 ACM 0-89791-769-3/9/01, pp. 145-156.

"Reconciling Responsiveness with Performance in Pure Object-Oriented Languages", by Urs Hölzle, et al, ACM Transactions on Programming Languages and Systems, vol. 18, No. 4, Jul. 1996, pp. 355-400.

"tcc: A System for Fast, Flexible, and High-level Dynamic Code Generation", by Massimiliano Poletto; et al., 1997 ACM 0-89791-907-6/97/0006, pp. 109-121.

Profile-guided Automatic Inline Expansion for C Progrmas, by Pohua P. Chang, et al., Software-Practice and Experience, vol. 22(5), May 1992, pp. 349-369.

"Fast, Effective Dynamic Compilation", by Joel Auslander, et al., 1996 ACM 0-89791-795-2/96/0005, pp. 149-159.

"Exploiting Hardware Performance Counters with Flow and Context Sensitive Profiling", by Glenn Ammons, et al., 1997 ACM 0-89791-907-6/97/0006, pp. 85-96.

"Continuous Program of Optimizations", by Thomas P. Kistler, University of California at Irvine, 1999, pp. 5-151.

"Efficient Compilation and Profile-Driven Dynamic Recompilation in Scheme", by Robert G. Burger, Indiana University, Mar. 1997, pp. ii-xi and 1-91.

"An Infrastructure for Profile-Driven Dynamic Recompilation", by Robert G. Buger, et al., Computer Science Department, Indiana University, pp. 1-10.

"Efficient Incremental Run-Time Specialization for Free", by Renaud Marlet, et al., University of Rennes, by , pp. 281-292.

"Optimizing ML with Run-Time Code Generation", by Peter Lee, et al., School of Computer Science, 1996 ACM 0-89791-795-2/96/0005, pp. 137-148.

"Continuous Profiling: Where Have All the Cycles Gone?", by Jennifer M. Anderson, et al., SRC Technical Note, 1997-016a, pp. 1-20.

"Implementing Jalapeño in Java", by Bowen Alpern, et al., 1999 ACM 1-58113-238-7/99/0010, pp. 314-325.

"An Evaluation of Staged Run-Time Optimizations in DyC", by Brian Grant, et al., Department of Computer Science and Engineering, University of Washington, pp. 293-304.

"The Jalapeño virtual machine", by B. Alpern, IBM Systems Journal, vol. 39, No. 1, 2000, pp. 211-238.

* cited by examiner

SYSTEM AND METHOD FOR ADAPTIVELY OPTIMIZING PROGRAM EXECUTION BY SAMPLING AT SELECTED PROGRAM POINTS

BACKGROUND OF THE INVENTION

1. Field of the Invention

This invention relates generally to computer program execution systems, e.g., optimizing compilers, and more specifically, to a sampling-based system and method implementing yield points in executing programs to enable the checking of multiple system conditions, and invocation of different runtime services when the yield point is taken in order to adaptively optimize software application during runtime.

2. Discussion of the Prior Art

The dynamic nature of the Java programming language presents both the largest challenge and the greatest opportunity for high-performance Java implementations. Language features such as dynamic class loading and reflection prevent straightforward applications of traditional static compilation and interprocedural optimization. As a result, Java Virtual Machine (JVM) implementors have invested significant effort in developing dynamic compilers for Java. Because dynamic compilation occurs during application execution, dynamic compilers must carefully balance optimization effectiveness with compilation overhead to maximize total system performance. However, dynamic compilers may also exploit runtime information to perform optimizations beyond the scope of a purely static compilation model.

The first wave of virtual machines provided Just-In-Time (JIT) compilation that relied on simple static strategies to choose compilation targets, typically compiling each method with a fixed set of optimizations the first time it was invoked. These virtual machines include early work such as the Smalltalk-80 as described in "Efficient implementation of the Smalltalk-80 System", 11th Annual ACM Symposium on the Principles of Programming Languages, pages 297–302, January 1984, and Self-91 such as described in the references "Making pure object-oriented languages practical", ACM Conference on Object-Oriented Programming Systems, Languages, and Applications, pages 1–15, November 1991 to C. Chambers et al. and "The Design and Implementation of the Self Compiler, an Optimizing Compiler for Object-Oriented Programming Languages", Craig Chambers PhD thesis, Stanford University, March 1992 published as technical report STAN-CS-92-1420, as well as a number of more recent Java systems such as described in A.-R. Adl-Tabatabai, et al., "Fast, effective code generation in a Just-in-Time Java compiler," Proceedings of the ACM SIGPLAN'98 Conference on Programming Language Design and Implementation (PLDI), pages 280–290, Montreal, Canada, 17–19 Jun. 1998 and SIGPLAN Notices, 33(5), May 1998, M. G. Burke, et al., "The Jalapeno dynamic optimizing compiler for Java", ACM 1999 Java Grande Conference, pages 129–141, June 1999, A. Krall et al., "Efficient Java VM Just-in-Time compilation", J.-L. Gaudiot, editor, International Conference on Parallel Architectures and Compilation Techniques, pages 205–212, October 1998, and, B.-S. Yang, et al., "LaTTe: A Java VM Just-in-Time compiler with fast and efficient register allocation", International Conference on Parallel Architectures and Compilation Techniques, October 1999.

A second wave of more sophisticated virtual machines moved beyond this simple strategy by dynamically selecting a subset of all executed methods for optimization, attempting to focus optimization effort on program hot spots. Systems in this category include: the Self-93 system described in "Reconciling responsiveness with performance in pure object-oriented languages", ACM Transactions on Programming Languages and Systems, 18(4):355–400, July 1996 to Hölzle, et al.; the HotSpot JVM such as described in "The Java Hotspot performance engine architecture", white paper available at http://java.sun.com/products/hotspot/whitepaper.html, April 1999; the IBM Java Just-in-Time compiler (version 3.0) described in "Overview of the IBM Java Just-in-Time compiler", IBM Systems Journal, 39(1), 2000 to T. Suganama, et al.; and, JUDO as described in "Practicing JUDO: Java Under Dynamic Optimizations", SIGPLAN 2000 Conference on Programming Language Design and Implementation, June 2000 to M. Cierniak, et al. Some second-wave virtual machines also include limited forms of online feedback-directed optimization (e.g., inlining in Self-93), but do not develop general mechanisms for adaptive online feedback-directed optimization.

Many modern programming language runtime environments and tools can benefit from runtime feedback from a program. For example, Java virtual machines may use runtime feedback to guide optimization of the running program. As another example, program understanding tools may gather runtime information and report summaries to the user. An adaptive optimization system attempts to optimize an executing program based on its current execution. Such systems typically identify sections of the program where significant runtime is spent and recompiles those sections with an optimizing compiler.

Thus, a number of research projects have explored more aggressive forms of dynamic compilation: These projects have been described in the following references: "Fast, effective dynamic compilation", Proceedings of the ACM SIGPLAN '96 Conference on Programming Language Design and Implementation, pages 149–159, Philadelphia, Pa., 21–24 May 1996, and SIGPLAN Notices, 31(5), May 1996 to J. Auslander, et al.; "Dynamo: A transparent dynamic optimization system", SIGPLAN 2000 Conference on Programming Language Design and Implementation, June 2000 to V. Bala, et al.; "Efficient Compilation and Profile-Driven Dynamic Recompilation in Scheme", PhD thesis, Indiana University, 1997 to R. G. Burger; "An infrastructure for profile-driven dynamic recompilation", ICCL'98, the IEEE Computer Society International Conference on Computer Languages, May 1998, to R. G. Burger et al.; "A general approach for run-time specialization and its application to C", Conference Record of the 23rd ACM SIGPLAN-SIGACT Symposium on Principles of Programming Languages}, pages 145–156, January 1996 by C. Consel et al.; "DyC: An expressive annotation-directed dynamic compiler for C", Technical Report TR-97-03-03, University of Washington, Department of Computer Science and Engineering, March 1997 by B. Grant, et al.; "An evaluation of staged run-time optimizations in DyC", Proceedings of the ACM SIGPLAN'99 Conference on Programming Language Design and Implementation, pages 293–304, 1999 by B. Grant, et al.; "Continuous Program Optimization", PhD thesis, University of California, Irvine, 1999 by T. P. Kistler; "Dynamic specialization in the Fabius system", ACM Computing Surveys, 30(3es):1–5, September 1998, Article 23 by M. Leone et al.; "Efficient incremental run-time specialization for free", Proceedings of the ACM SIGPLAN '99 Conference on Programming Language Design and Implementation, pages 281–292, 1999, by R. Marlet, et al.; and, "A system for fast, flexible, and high-level dynamic code generation", Proceedings of the ACM SIGPLAN'97 Conference on Programming Language Design and Implementation (PLDI), pages 109–121, Las Vegas, Nev., 15–18 Jun. 1997, and SIGPLAN Notices 32(5), May 1997, by M. Poletto, et al. These aggressive forms of dynamic compilation use runtime information to tailor the executable to its current environment. Most of these systems are not fully automatic, and so far, few of these techniques have appeared in mainstream JVMs. However, these systems have demonstrated that online feedback-directed optimizations can yield substantial performance improvements.

Therefore, it would be highly desirable to provide an adaptive online feedback-directed optimization system for leading-edge JVM technology.

Previous adaptive systems such as described in the reference "Overview of the IBM Java just-in-time compiler," IBM Systems Journal, 39(1), 2000 by T. Suganama, et al., and the reference "Reconciling responsiveness with performance in pure object-oriented languages", ACM Transactions on Programming Languages and Systems, 18(4):355–400, July 1996 to Hölzle, et al. have relied on intrusive instrumentation in the form of method invocation counters to identify and optimize program hot spots. Two drawbacks to this approach are: 1) the overhead of incrementing a counter on every method invocation, and 2) the final optimization of a method removes the method invocation counters, preventing the method from being identified as a candidate for future recompilation.

For example, U.S. Pat. No. 5,995,754 to Hölzle, et al., describes a system (hereinafter the "Self-93" system) for compiling byte-codes associated with executing programs at run-time, and specifically directed to a mechanism for re-compiling previously compiled or interpreted code dynamically, into a more efficient form. In the "Self-93" system, use is made of an invocation tracker for tracking the number of invocations of a particular selected method. When the number of invocations exceeds a certain threshold value, a method is chosen to be compiled. Particularly, in the Self-93 system, a call stack, i.e., a thread-specific runtime data structure that keeps track of the methods that are currently active in a particular thread, is examined when an invocation counter threshold is reached with the goal of determining which active method on the call stack is a likely candidate to be compiled. The method to be compiled may then be chosen using parameterizable heuristics, such as the size of a method, with the goal that the method that had the counter exceed its threshold is ultimately inlined, and thus, compiled, into the chosen method. When this occurs such method is no longer a candidate for optimization in this context. If there are calls to this method from other methods it may be optimized in that context, but again, this can only happen once.

It would be highly desirable to provide an adaptive optimization system for a JVM that implements a sampling technique having lower overhead than invocation counters and that drives adaptive and online feedback-directed optimizations.

It would be further highly desirable to provide an adaptive optimization system for a JVM that uses multiple optimization levels to improve performance compared to using only a single level of optimization.

SUMMARY OF THE INVENTION

It is an object of the present invention to provide an adaptive optimization system for a Java Virtual Machine (JVM) that implements a sampling technique having lower overhead than invocation counters and that drives adaptive and online feedback-directed optimizations.

It is a further object of the present invention to provide an adaptive optimization system for a JVM that uses multiple optimization levels to improve performance compared to using only a single level of optimization.

According to the invention, there is provided a sampling-based system and method for adaptively optimizing a computer program executing in an execution environment, the execution environment comprising one or more compiler devices for providing various levels of program optimization, the system comprising: a runtime measurements sub-system for monitoring execution of the computer program to be optimized, the monitoring including obtaining raw profile data samples and characterizing the raw profile data; a controller device for receiving the characterized raw profile data from the runtime measurements sub-system and analyzing the data for determining whether a level of program optimization for the executing program is to be performed by a compiler device, the controller generating a compilation plan in accordance with a determined level of optimization; and, a recompilation sub-system for receiving a compilation plan from the controller and invoking a compiler device for performing the level of program optimization of the executing program in accordance with the compilation plan.

Advantageously, the sampling and adaptive optimization techniques of the invention may be applied not only to application (executing program) code, but also to the JVM itself. That is, the adaptive optimization may be applied to the JVM subsystems, including the compilers, the thread scheduler, the garbage collector, and the adaptive optimization system itself.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

For exemplary purposes, the present invention is described for operation in a particular JVM targeting server applications that implement a "compile-only" strategy by compiling all methods to native code before they execute, such as described in the references "Jalapeno Virtual Machine", IBM Systems Journal, 39(1), 2000 by B. Alpern, C. R. Attanasio, et al and "Implementing Jalapeno in Java", ACM Conference on Object-Oriented Programming Systems, Languages, and Applications, 1999, both of which are incorporated by reference as if fully set forth herein. However, it is understood that the principles of adaptive optimization as described herein may be applicable for any runtime environment, e.g., JVM, interpreters, Just-in-Time compilers, etc.

It is assumed the JVM system includes two operational compilers: 1) a baseline compiler for translating bytecodes directly into native code by simulating Java's operand stack without performing register allocation; and, 2) an optimizing compiler for translating bytecodes into an intermediate representation, upon which it performs a variety of optimizations.

Figure 1:
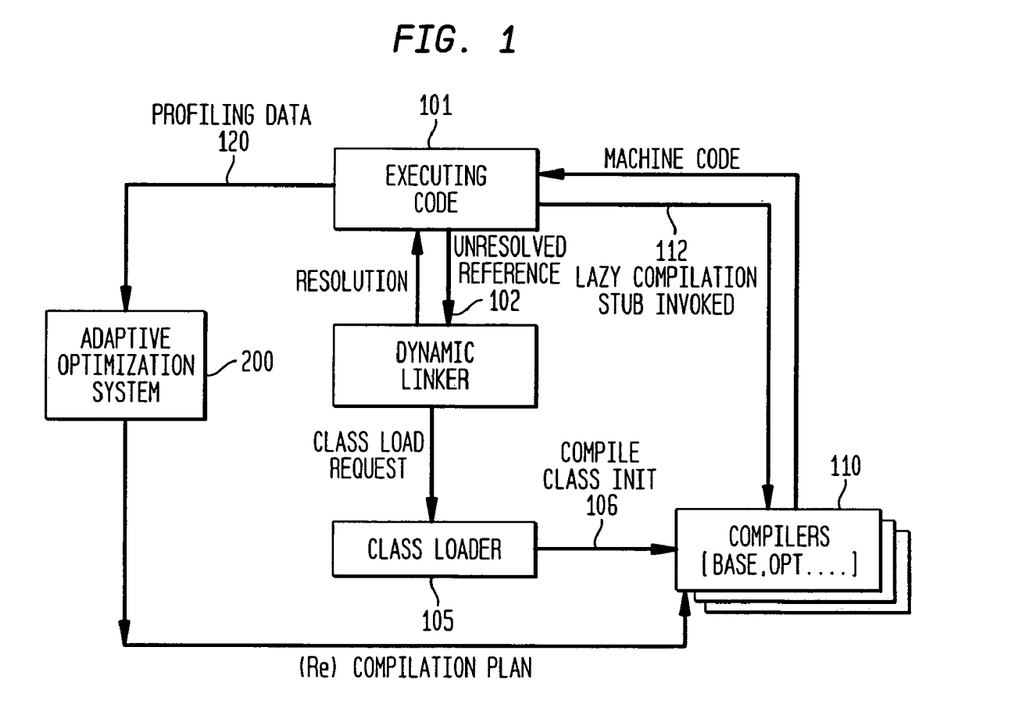
FIG. 1 illustrates compilation scenarios for the JVM 100 implementing the adaptive optimization techniques of the invention.

In the JVM, Java threads are multiplexed onto JVM virtual processors, which are implemented as operating system threads. The underlying operating system in turn maps pthreads to physical processors (CPUs). At any given moment in time, each virtual processor may have any number of Java threads assigned to it for execution. The system supports thread scheduling with a quasi-preemptive mechanism. Further, each compiler generates yield points, which are program points where the running thread checks a dedicated bit in a machine control register to determine if it should yield the virtual processor. According to a preferred embodiment, the compilers insert these yield points in method prologues and on loop back edges. As known, algorithms exist for optimally placing yield points to reduce the dynamic number of yield points executed while still supporting effective quasi-preemptive thread scheduling. Using a timer-interrupt mechanism, an interrupt handler periodically sets a bit on all virtual processors. When a running thread next reaches a yield point, a check of the bit will result in a call to the scheduler. FIG. 1 illustrates compilation scenarios for the JVM 100 implementing the adaptive optimization system 200 of the invention. As shown in FIG. 1, the JVM compiler may be invoked in three ways. First, when the executing code 101 reaches an unresolved reference 102, causing a new class to be loaded, the class loader 105 invokes a compiler 110 to compile the class initializer 106 (if one exists). The class loader 105 also initializes the compiled code for all methods to a lazy compilation stub 112. The second compilation scenario occurs whenever the executing code attempts to invoke a method that has not yet been compiled. When this happens, the lazy compilation stub 112 is executed, which leads to the compilation of the method. In these first two scenarios, the application thread that caused the compiler to be invoked will stall until compilation completes. In the third scenario, which is the focus of the present invention, the adaptive optimization system 200 may invoke a compiler 110 when profiling data 120 suggests that recompiling a method with additional optimizations may be beneficial.

Figure 2:
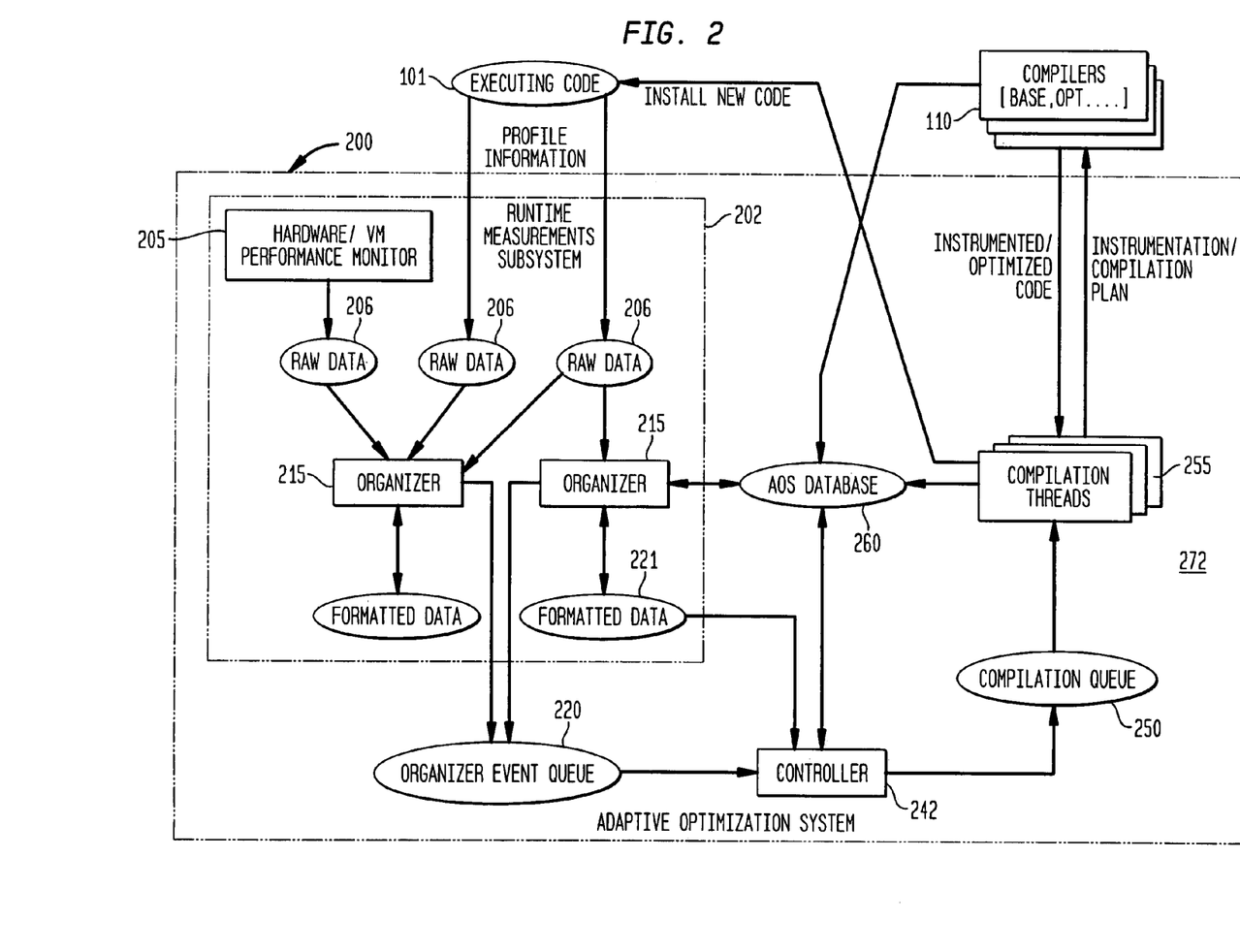
FIG. 2 depicts the internal structure of the JVM Adaptive Optimization System (AOS) 200 including the interactions between its subsystem components.

FIG. 2 depicts the internal structure of the JVM Adaptive Optimization System (hereinafter "AOS") 200 including the interactions between its subsystem components. As shown in FIG. 2, with more particularity, the JVM AOS 200 includes three subsystems, each of which encompasses one or more separate threads of control. These subsystems include: the runtime measurements subsystem 202, the controller 242, and the recompilation subsystem 272. In addition to these subsystem components, an AOS database 260 is included to provide a repository that records component decisions and allows components to query these decisions.

With more particularity, the runtime measurements subsystem 202 gathers information about the executing methods, summarizes the information, and then either passes the summary along to the controller 242 via an organizer event queue 220 or, records the information in the AOS database.

As shown in FIG. 2, the structure of the runtime measurements subsystem 202 is depicted. Several systems, including instrumentation in the executing code, hardware performance monitors and VM instrumentation 205, produce raw profiling data 206 as the program runs. Additionally, information is gathered by sampling program execution using techniques such as described in commonly-owned, co-pending U.S. patent application Ser. Nos. 09/703,527 and, 09/703,530. This sampling produces raw profiling data, which is typically collected in buffers (not shown). After sufficient raw data has been collected in a buffer, separate threads called organizers 215 periodically process and analyze the raw data. Thus, it is understood that the generation of raw profiling data is separated from the data analysis for two reasons: 1) it allows multiple organizers 215 to process the same raw data, possibly in different ways; 2) this separation allows low-level profiling code to execute under strict resource constraints. This is because not only just application code may be monitored, but also system services of the VM. So, for example, low-level code that monitors the VM memory allocator must not allocate any objects (it must use pre-allocated data structures and buffers) and should complete its task in a short time period.

Controller

The controller 242 is the brains of the adaptive optimization system 200 as it directs the other subsystem components how to perform their tasks. As directed by the controller's measurement strategy, the runtime measurement subsystem gathers information about executing Java methods (including those of the JVM itself) and provides it to the controller. Using this information, the controller formulates new measurement and recompilation strategies and communicates them to the other subsystems. The recompilation strategy may range from not optimizing any methods to compiling several methods at the highest optimization levels.

With respect to FIG. 2, the controller 242 directs the data monitoring and creates organizer threads 215 to process the raw data at specific time intervals. When awoken, each organizer 215 analyzes raw data, and packages the data into a suitable format 221 for input to the controller. Additionally, an organizer 215 may add information to an organizer event queue 220 for the controller to process, or may record information in the AOS database 260 for later queries by other AOS components.

The controller 242 orchestrates and conducts operation of the other components of the adaptive optimization system. For example, it coordinates the activities of the runtime measurements subsystem and the recompilation subsystem. The controller initiates all runtime measurement subsystem profiling activity by determining what profiling should occur, under what conditions, and for how long. It receives information from the runtime measurement subsystem 202 and AOS database 260, and uses this information to make compilation decisions. It passes these compilation decisions to the recompilation subsystem 272, for directing the actions of the various compilers. Based on information from the runtime measurements subsystem and the AOS database, the controller may perform the following actions: 1) it may instruct the runtime measurements subsystem to continue or change its profiling strategy, which could include using the recompilation subsystem to insert intrusive profiling; and, 2) it may recompile one or more methods using profiling data to improve their performance. As will be described in further detail, the controller makes these decisions based on an analytic model representing the costs and benefits of performing these tasks.

Preferably, the controller thread is created during JVM boot time. It subsequently creates the threads corresponding to the other subsystems: organizer threads to perform runtime measurements and compilation threads to perform recompilation. The controller further communicates with the other two sub-system components using priority queues: it extracts measurement events from the organizer event queues 220 that is filled by the runtime measurements subsystem and inserts recompilation decisions into a compilation queue 250 that compilation threads 255 process. When these queues are empty, the dequeuing thread(s) sleep. The various system components also communicate indirectly by reading and writing information in the AOS database 260.

Recompilation Subsystem

The recompilation subsystem consists of compilation threads 255 that invoke compilers 110. The compilation threads extract and execute compilation plans that are inserted into the compilation queue 250 by the controller 242. Recompilation occurs in separate threads from the application, and thus, may occur in parallel. Preferably, the compilation threads check a compilation queue for work to be performed. When the queue is empty, as is the case initially, the compilation threads sleep.

Each compilation plan consists of three components: an optimization plan, profiling data, and an instrumentation plan. The optimization plan specifies which optimizations a compiler should apply during recompilation. The profiling data, initially gathered by the runtime measurements subsystem, directs the optimizing compiler's feedback-directed optimizations. Instrumentation plans dictate which, if any, intrusive instrumentation the compiler should insert into the generated code.

For instance, the controller communicates to the recompilation subsystem 272 any value- or control flow-based information reported by the runtime measurements system. To implement a measurement plan, the controller may also direct the compiler to insert instrumentation to obtain fine-grain profiling information of the method. The recompilation subsystem takes the output of the compiler, a Java object that represents the executable code and associated runtime information (exception table information and garbage collection maps), and installs it in the JVM 101, so that all future calls to this method will use a new version.

AOS Database

The AOS database 260 provides a repository where the adaptive optimization system records decisions, events, and static analysis results. The various adaptive system components query these artifacts as needed.

For example, the controller 242 uses the AOS database to record compilation plans and to track the status and history of methods selected for recompilation. The compilation threads also record the time taken to execute each compilation plan in the database. The data on previous compilation plans executed for a method may then be queried by the controller to provide some of the inputs to the recompilation model described above with respect to recompilation.

As another example, the compilation threads record static analysis and inlining summaries produced by the optimizing compiler. The controller and organizer threads query this information as needed to guide recompilation decisions. More details on the implementations are discussed herein in more detail with respect to the inlining. One important use of this information, in a preferred implementation, is to detect when a previously optimized method should be considered for further optimization because the current profiling data indicates an opportunity for new inlining opportunities that were missed when the method was originally optimized. This use of the database is discussed in more detail herein with respect to the inlining.

Multi-Level Recompilation

Figure 3:
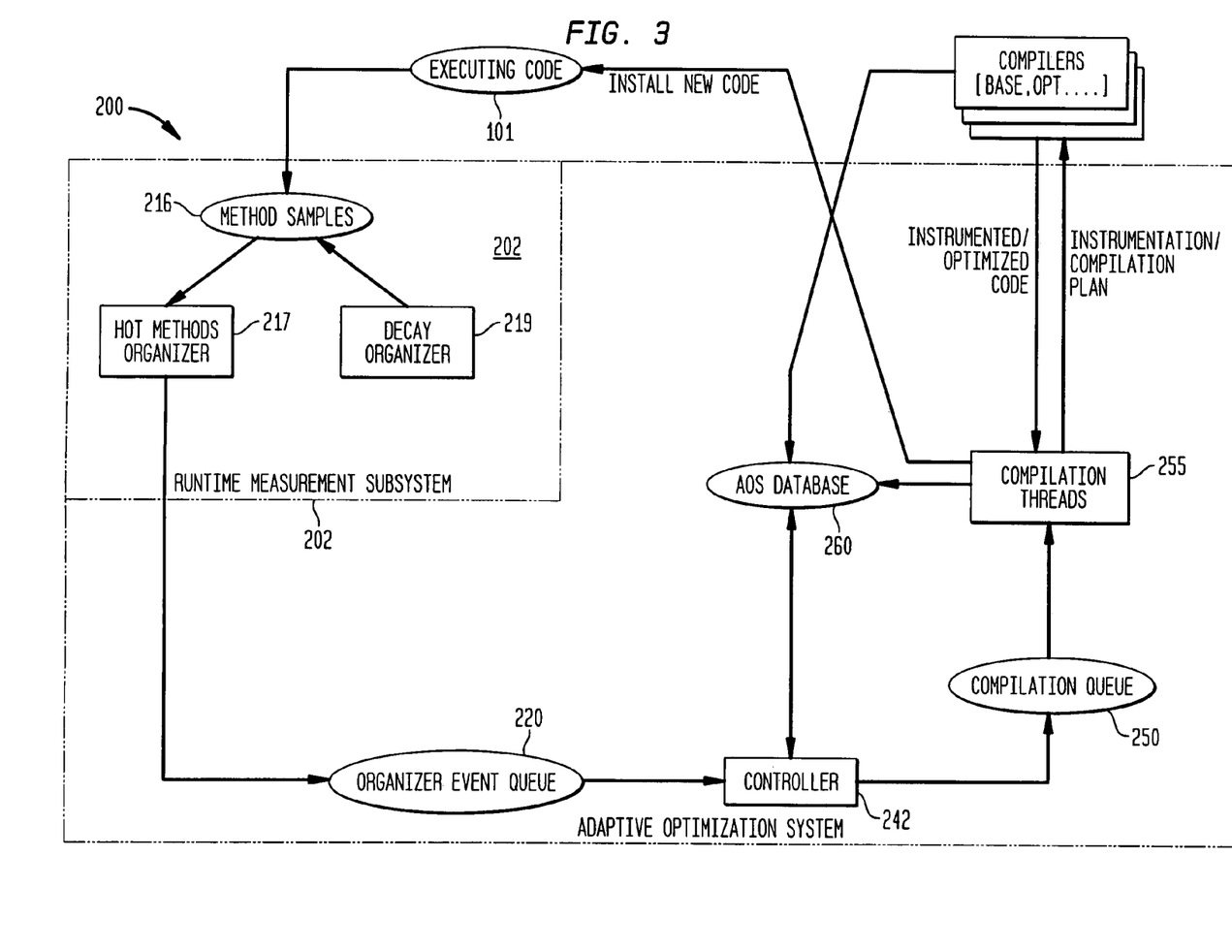
FIG. 3 is an illustrative overview of the adaptive recompilation system according to the present invention.

An overview of the adaptive recompilation system is now described with respect to FIG. 3. As mentioned, the controller thread 242 creates threads corresponding to the other subsystems, e.g., organizer threads 215 to perform sample-based runtime measurements; and, a compilation thread 255 to perform recompilation. After these threads are created, the controller 242 sleeps until the runtime measurements subsystem inserts an event in the organizer event queue.

In one implementation of the adaptive optimization system, two organizer threads periodically process the raw data: a hot methods organizer 217 and, optionally, a decay organizer thread 219. The hot methods organizer 217 installs a sampling object, e.g., a "listener method", for processing method samples 216 and inserting "hot" method events in the organizer event queue 220 to enable the controller to consider the methods for recompilation. Each event contains a method ID and an indication of its relative "hotness". The hot methods organizer 217 is parameterized by the controller by such quantities as a sample size to determine the duration for sampling, and a maximum number of methods to return as being hot.

The decay organizer 219 functions to decay counters included in the runtime measurements subsystem 202 and is provided as an optional implementation. Such counters to be decayed include a hot method counter and the counters associated with call graph edges as will be discussed herein with respect to inlining. By decaying the counters, the system gives more weight to recent samples when determining method or call graph edge hotness. The decay organizer 219 does not communicate directly with the controller.

With more particularity, the compilation thread 255 extracts compilation plans from the compilation queue 250 and invokes the optimizing compiler 110 passing in the compilation plan. The compilation thread 250 records the compilation time for the recompiled method in the AOS database 260 to allow for more accurate modeling of future recompilation decisions.

Sampling

The adaptive optimization system of the invention is a sample-based system whereby, in the runtime measurement subsystem, samples of the distinguished program points, i.e., those points at which yield points have been inserted into the program, are collected. As will be described, consideration is given to the following: 1) when a yield point is taken; 2) what profiling information is collected when a yield point is taken; and 3) how and at what intervals should the raw profiling data be processed by organizers to produce formatted data for the controller. Further considered is how the controller 242 evaluates the information provided to it by the organizers to identify profitable methods to optimize.

With regard to the placement of yield points, although yield points may be placed at an arbitrary subset of program points, the preferred embodiment places yield points in all method prologues and in all loop headers (a back edge). As, in some circumstances, identifying loop headers may incur unacceptable levels of overhead, an alternative placement of yield points in all method prologues and at the targets of all backwards intra-procedural branches may be used instead. In either case, the system distinguishes between prologue yield points and loop yield points and may take different sampling actions when a yield point is taken in a method prologue than when a yield point is taken in a loop.

Abstractly, a prologue yield point performs the following system operations represented by the following pseudocode:

```
if (shouldTakePrologueYieldPoint) then
    takePrologueSample( )
end
```

Similarly, a loop yield point performs the following system operations:

```
if (shouldTakeLoopYieldPoint) then
    takeLoopSample( )
end
```

A preferred embodiment implements a timer based approach. Preferably, associated with shouldTakePrologueYieldPoint and shouldTakeLoopYieldPoint is a reserved bit in the computer memory which indicates when a yield point should be taken. This bit is referred to as the "trigger bit" and is initially set to 0. Using standard operating system signal mechanisms, an interrupt is arranged to occur at periodic time intervals. An interrupt handler is coded to catch the timer interrupt. When the handler catches the interrupt, it sets the trigger bit to be 1. Yield points check the value of the trigger bit, and when it is 1 the yield point is taken, a sample is collected, and the trigger bit is reset to 0. In this implementation, the pseudo code for prologue yield points is as follows:

```
if (triggerBit == 1) then
    takePrologueSample( )
    triggerBit = 0
end
```

Similarly, the pseudo code for loop yield points is as follows:

```
if (triggerBit == 1) then
    takeLoopSample( )
    triggerBit = 0;
end
```

In some architectures, an efficient implementation may be to dedicate a bit in one of the CPU's condition registers to hold the trigger bit.

An alternative to the timer-based approach is use of a decrementing counter to arrange that a fixed percentage of all executed yield points are taken. For example, an implementation of the counter-based approach is given by the following pseudo-code for prologue yield points:

```
if (yieldPointCounter == 0) then
    takePrologueSample( )
    yieldPointCounter = numYieldPointsToSkip;
else
    yieldPointCounter = yieldPointCounter - 1;
end
```

Similarly, the pseudo-code for loop yield points for this approach is:

```
if (yieldPointCounter == 0) then
    takeLoopSample( )
    yieldPointCounter = numYieldPointsToSkip;
else
    yieldPointCounter = yieldPointCounter - 1;
end
```

As will be appreciated by those skilled in the art, a counter-based yield point taking mechanism may be efficiently implemented on hardware architectures such as the PowerPC that include a count register and a decrement and conditional branch on count instruction.

A third approach blends the first two implementations by using a combined counter and timer based yield points in method prologues with a timer only yield point in loops. This may be desirable to support profile-directed inlining. An implementation of this approach is given by the following pseudo-code for prologue yield points:

```
if (triggerBit == 1 || yieldPointCounter == 0) then
    takePrologueSample( )
    if (triggerBit) then
        triggerBit = 0;
    end
    if (yieldPointCounter == 0)
        yieldPointCounter = numYieldPointsToSkip;
    end
else
    yieldPointCounter = yieldPointCounter - 1;
end
```

For loop yield points a pseudocode implementation is as follows:

```
if (triggerBit == 1) then
    takeLoopSample( )
    triggerBit = 0;
end
```

Again, those skilled artisans will appreciate that the above prologue yield point may be efficiently implemented on architectures with a count register and associated machine instructions.

In accordance with the teachings of commonly-owned, co-pending U.S. patent application Ser. No. 09/703,527, the contents and disclosure of which are incorporated by reference herein, it is understood that a wide variety of sampling information may be collected when a yield point is taken. That is, a low-level mechanism exists that is available to map from a taken yield point to a method. Typical mechanisms include (1) inspecting the hardware state to determine the instruction address at which the yield point was taken and mapping that address to a method; and (2) inspecting the program's runtime stack to identify the method in which the yield point was taken, possibly by inspecting the return addresses stored on the runtime stack. These low-level sampling mechanisms may further identify and track executing further information such as method call-context, basic blocks (execution of control flow paths within executing methods) and program variable values which may be processed for characterizing program behavior.

Implementations of takePrologueSample and takeLoopSample are now provided. One implementation of takePrologueSample and takeLoopSample comprises determining which method was executing when the yield point was taken and incrementing a counter associated with that method. If the yield point was taken in a loop, then the sample should be attributed to the method containing the loop. If yield point was taken in a prologue, then the sample may be attributed to the calling method, the called method, or to both the calling and called method. A preferred embodiment is to attribute 50% of a sample to each of the caller and callee methods.

In addition to incrementing a method counter, more complex samples may be taken to aid method inlining. For example, the techniques described in commonly-owned, co-pending U.S. patent application Ser. No. 09/703,530 are potential embodiments for takePrologueSample.

According to the preferred embodiment, the system makes a determination of when enough samples have been taken to make it profitable to invoke an organizer to process the raw data and communicate the resulting formatted data to the controller. The basic mechanism relies on counting how many samples are taken and notifying all interested organizers when a sample threshold is exceeded. For example, a mechanism implemented for takePrologueSample is exemplified by the following pseudo-code:

```
subroutine takePrologueSample( )
  collect a prologue sample
  increment numSamples
  if (numSamples >= sampleSize) then
    notify all interested organizers
    numSamples = 0
  end
```

Likewise, the mechanism implemented for takeLoopSample is exemplified by the following pseudo-code:

```
subroutine takeLoopSample( )
  collect a loop sample
  increment numSamples
  if (numSamples >= sampleSize) then
    notify all interested organizers
    numSamples = 0
  end
```

The variable sampleSize may either be a fixed constant, or it may be adaptively varied by the controller. For example, it may be desirable for the controller to increase sampleSize when the application is in a steady state to reduce organizer and controller overhead. It may also be desirable to decrease sampleSize when the application's working set is rapidly changing to enable the controller to quickly identify the new set of important methods to optimize. One mechanism for accomplishing both of these goals is to have the controller 242 track the decision it makes for each event it processes from the organizer event queue 220. In particular, the controller tracks the length of sequences of events for which it decides to: (1) optimize a method and (2) not optimize anything. When the controller is frequently deciding to optimize a method based on the profiling data, then it decreases the sample size. When the controller is frequently deciding to do nothing, it increases the sample size.

After collecting the number of samples specified by its current sample size, the method listener wakes the hot methods organizer thread. When awoken, the hot methods organizer scans the method counter raw data to identify methods where the application spends most of its time. The organizer deems a method to be "hot" if the percentage of samples attributed to that method exceeds a controller-directed threshold and the method is not already compiled at the maximum optimization level available. For each hot method it discovers, the hot methods organizer enqueues an event in the organizer event queue that contains the method and the percentage of samples attributed to the method. Similarly, the controller dynamically adjusts the hotness threshold to approximately control the number of hot methods reported by the hot methods organizer. If after several sampling periods, "not enough" hot methods are being returned, then the controller can decrease the hotness threshold. On the other hand, if "too many" hot methods are being returned for several sampling periods, then the controller can increase the threshold.

The following pseudo-code for the controller's main loop illustrates this as follows:

```
begin
  numDidSomething = 0;
  numDidNothing = 0;
  do
    event = removeEventFromOrganizerQueue( );
    if (shouldOptimize(event)) then
      numDidNothing = 0
      increment numDidSomething
      if (numDidSomething > threshold) then
        decrease sampleSize
        numDidSomething = 0
      end
    else
      numDidSomething = 0
      increment numDidNothing
      if (numDidNothing > threshold) then
        increase sampleSize
        numDidNothing = 0
      end
    end
  end
end
```

Some possible implementations of shouldOptimize are described below. The call to removeEventFromOrganizerQueue blocks until an event is available. The value of threshold is an implementation dependent constant. It may be desirable to set upper and lower bounds on sampleSize to provide guarantees on response time and maximum controller overhead.

Controller Decision Making

Based on the data provided to it by the organizers, the controller sub-system 242 must decide which methods, if any, currently merit optimization. A number of algorithms may be used for making this decision. For example, in each sampling interval, the controller may always optimize the hottest "N" methods that are not already optimized. Alternately, in each sampling interval, the controller may choose to always optimize any method that is not already optimized and accounts for more than N % of the total samples taken. That is, in order to avoid performing unnecessary recompilation throughout the application, the recompilation organizer may optionally return only methods that have not already been recompiled at the maximum optimization level. This filtering assures that the controller does not choose to recompile methods that are already recompiled at the highest optimization level. However, if optimization is tailored to dynamic characteristics of a method, it may be beneficial to reoptimize a method even at the highest opt level.

In the preferred embodiment, the controller uses an analytic model to perform a cost/benefit analysis to determine which methods should be optimized, and at what optimization level each method should be optimized. For purposes of illustration, the optimization levels available to the controller are numbered from "0" to "N". For instance, the compiler's optimizations may be grouped into several levels: a baseline level, Level 0; a first level, Level 1, comprising mainly of a set of optimizations performed on-the-fly during the translation from bytecodes to the intermediate representation. As these optimizations reduce the size of the generated IR (intermediate representation), performing them tends to reduce overall compilation time. For example, the compiler performs optimizations during IR generation including, but not limited to: constant, type, non-null, and copy propagation; constant folding and arithmetic simplification; unreachable code elimination; and elimination of redundant nullchecks, checkcasts, and array store checks; a second level, Level 2, which augments level 1 with additional local optimizations such as common sub-expression elimination, array bounds check elimination, and redundant load elimination. It also adds inlining based on static-size heuristics, global flow-insensitive copy and constant propagation, global flow-insensitive dead assignment elimination, StringBuffer synchronization optimizations, and scalar replacement of aggregates and short arrays; and, a third level, Level 3, which augments level 2 with SSA-based flow-sensitive optimizations. In addition to traditional SSA optimizations on scalar variables, the JVM system also uses an extended version of Array SSA form to perform redundant load elimination and array bounds check elimination.

For a method "m" currently compiled at level "i", the controller estimates the following quantities:

$T_i$, the expected time the program will spend executing method "m" if "m" is not recompiled;

$C_j$, the cost of recompiling method "m" at optimization level "j", for $i \leq j \leq N$. It should be understood that the model considers recompilation at the same level because new profiling information may enable additional speedups over the previous version compiled at level "i". This is encoded by a feedback-directed optimization boost factor that is used in the calculation of $T_j$.

$T_j$, the expected time the program will spend executing method "m" in the future, if "m" is recompiled at level "j".

Using these estimated values, the controller identifies the recompilation level "j" that minimizes the expected future running time of a recompiled version of "m"; i.e., it chooses the "j" that minimizes the quantity $C_j+T_j$. If $C_j+T_j<T_i$, the controller decides to recompile "m" at level "j"; otherwise it decides to not recompile.

Clearly, the factors in this model are unknowable in practice. The preferred embodiment is based on the fairly simple estimates as now described.

First, the controller sub-system 242 assumes the program will execute for twice its current duration. So, if the application has run for 5 seconds, the controller assumes it will run for 5 more seconds; if it has run for 2 hours, then it will run for 2 more hours. $T_f$ is defined to be the future expected running time of the program.

The system additionally keeps track of where the application spends time as it runs, using the sampling techniques described previously. The system uses a weighted average of these samples to estimate the percentage of future time $P_m$ in each method, barring recompilation. From this percentage estimate and the future time estimate, the controller predicts the future time spent in each method as follows:

$$T_i = T_f * P_m$$

For example, if the weighted samples indicate that the application will spend 10% of its time in method "m" and the code has run for 10 seconds, the controller will estimate the future execution time of "m" to be 1 second.

The weight of each sample starts at one and decays periodically. Thus, the execution behavior of the recent past exerts the most influence on the estimates of future program behavior. When the controller recompiles methods, it adjusts the future estimates to account for the new optimization level, and expected speedup due to recompilation. The system estimates the effectiveness of each optimization level as a constant based on offline measurements. Let $S_k$ be the speedup estimate for code at level "k" compared to level "0". Then, if method "m" is at level "i", the future expected running time if recompiled at level "j" is given by $$T_j = T_i * S_i / S_j$$

To complete the cost-benefit analysis, the controller is able to estimate the cost of recompilation. The preferred embodiment uses a linear model of the compilation speed for each optimization level, as a function of method size. This model is calibrated offline, however, it is understood that other models are possible including those computed on-line.

Feedback-Directed Inlining

According to the principles of the invention, a sampling technique is provided that may be used to determine what methods to optimize, i.e., the "hot" methods. According to another aspect of the invention, the preferred sampling technique may also be used to determine how to optimize these hot methods. This process is called online feedback-directed optimizations (FDO), i.e., optimizations that are chosen because of feedback from the current executing program.

To facilitate online FDO the runtime measurement sub-system is augmented to capture information about the characteristics of methods being executed. Such characteristics may include: calling context information, such as described in commonly-owned, co-pending U.S. patent application Ser. No. 09/703,530 incorporated herein by reference, values of parameters passed to a method, and common control flow path information through a method. Other characteristics are possible.

Figure 4:
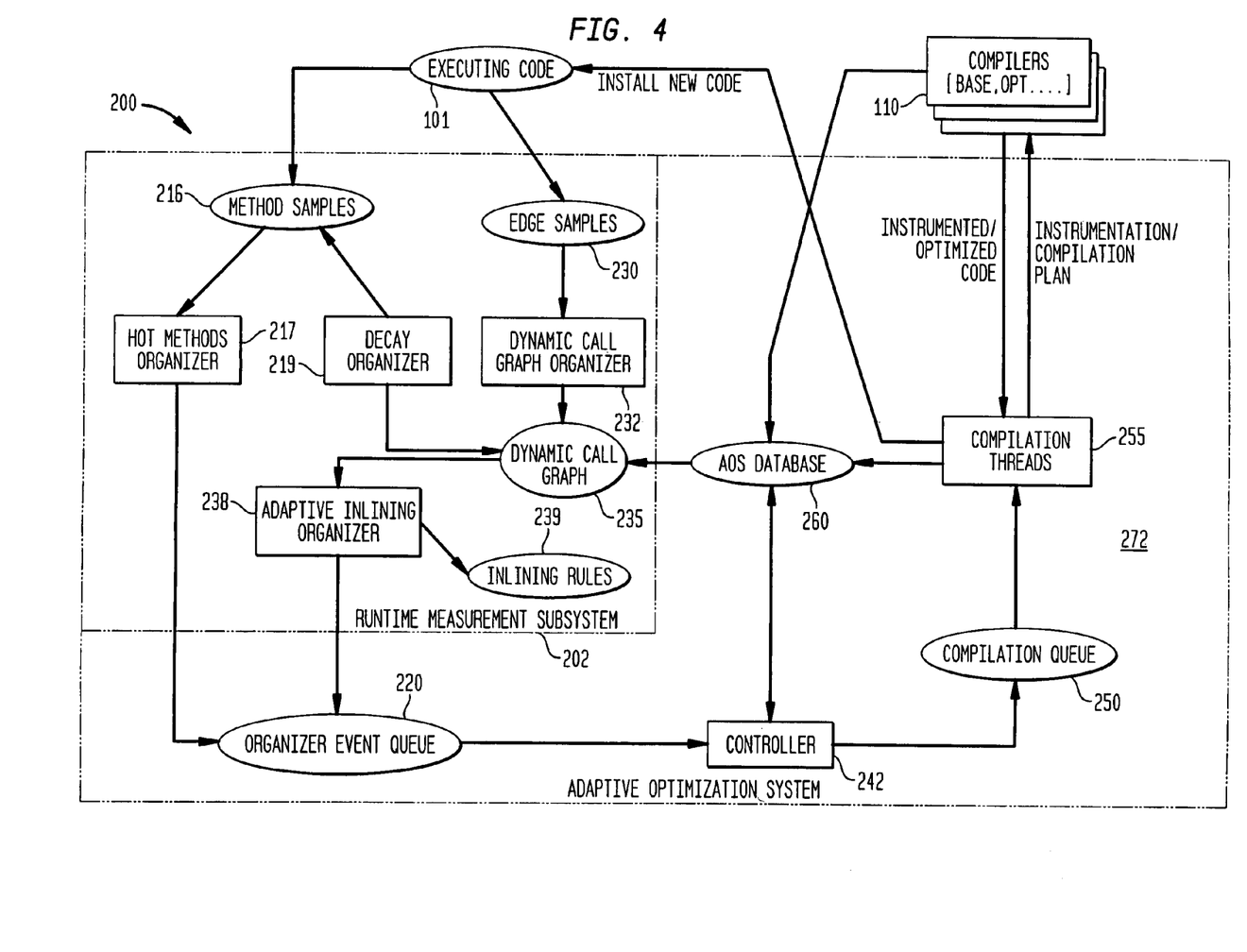
FIG. 4 illustrates an implementation for performing online feedback-directed optimizations using the architectural framework depicted in FIG. 3.

Calling context information may be used to assist the optimizing compiler in making inlining decisions. At a high level, the system takes a statistical sample of the method calls in the running application and maintains an approximation to the dynamic call graph based on this data. Using this approximate dynamic call graph, the system identifies "hot" edges to inline, and passes the information to the optimizing compiler. The system may choose to recompile already optimized methods to inline hot call edges. FIG. 4 illustrates the structure of the implementation using the architectural framework depicted in FIG. 3. When a thread switch occurs in a method prologue, the system calls the update method of an edge listener (as well as the method listener, not shown). This edge listener walks the thread's stack to determine the call site that originated the call. The edge listener creates a tuple 230 identifying the calling edge (specified by the caller, call site, and callee) and inserts this tuple into a buffer.

When the buffer becomes full, the edge listener is temporarily deactivated (its update method will not be called again at a prologue thread switch) and it notifies the dynamic call graph (DCG) organizer 232 to wake up and process the buffer. The DCG organizer maintains a dynamic call graph 235, where each edge corresponds to a tuple value in the buffer. After updating the weights in the dynamic call graph, the DCG organizer clears the buffer, and reactivates the edge listener. The optional decay organizer 219, a separate thread, periodically decays the edge weights in the dynamic call graph.

Periodically, the DCG organizer 232 invokes the adaptive inlining organizer 238 to recompute adaptive inlining decisions. The adaptive inlining organizer performs two functions. First, it identifies edges in the dynamic call graph whose percentage of samples exceed an edge hotness threshold. These edges are added to an inlining rules data structure 239, which is consulted by the controller when it formulates compilation plans. Any edge in this data structure will be inlined if the calling method is subsequently recompiled, subject to generous size constraints. The system sets the initial edge hotness threshold fairly high, but periodically reduces it until reaching a fixed minimal value. Effectively, this forces inlining to be more conservative during program startup, but allows it to become progressively more aggressive as profiling data accumulates.

The second function of the adaptive inlining organizer 238 of FIG. 4 is to identify methods that are candidates for further recompilation to enable inlining of hot call edges. To be identified as a recompilation candidate by the inlining organizer, a method must satisfy two criteria. First, the method must be hot, as defined by the hotness threshold used by the hot method organizer. Second, recompiling the method must force a new inlining action, as dictated by the inlining rules data structure 239.

When the adaptive inlining organizer identifies a method for recompilation, it enqueues an event representing the method for consideration by the controller. The organizer estimates a boost factor, i.e., an estimate of the greater efficacy of optimization on the method, due to the adaptive inlining rules. The controller incorporates this boost factor into its cost/benefit model described herein.

It is understood that many factors can contribute to the expected boost factor, including the elimination of call/return overhead and additional optimizations enabled by inlining. Values of parameters can be used to construct specialized versions of the methods where parameters are assumed to have certain common values. For example, if the system may determine that a method is often called with a value of 100 passed as the first parameter, a special version of the called method may be constructed, where the optimizing compiler assumes the parameter has the value of 100 and propagates this value throughout the method. Because a method's computation is often dependent on the value of its parameter, this specialization can lead to a more efficient version of the method.

Common control flow path information can be used to optimize machine code layout. For example, instructions on hot control flow paths can be located sequentially to improve i-cache performance. This information can also be useful in guiding register allocation decisions, such as when to spill a register to memory.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For example, the sampling and adaptive optimization techniques of the invention may be applied not only to application code, but also to the JVM itself. That is, the adaptive optimization may be applied to the JVM subsystems, including the compilers, the thread scheduler, the garbage collector, and the adaptive optimization system itself.

Having thus described our invention, what we claim as new, and desire to secure by Letters Patent is:

1. A sampling-based system for adaptively optimizing a computer program executing in a virtual machine execution environment, said virtual machine execution environment including one or more compiler devices for providing various levels of program optimization, said system comprising:
   a runtime measurements sub-system for monitoring execution of said computer program to be optimized, said monitoring including obtaining raw profile data samples and characterizing said raw profile data, said run-time measurements sub-system comprising:
   means for identifying instances of yield points previously inserted at distinguished locations in said program, each said yield point indicating a potential sampling operation during execution of said program;
   means for determining a condition for performing a sampling operation of said executing program at an identified yield point instance; and,
   means for performing said sampling operation of said executing program upon satisfaction of said condition, said sampling including collecting said raw profile data used in characterizing behavior of said execution environment, whereby sampling operations performed at yield points occur at a subset of the executions of yield points;
   a controller device for receiving said characterized raw profile data from said runtime measurements sub-system and analyzing said data for determining whether a predetermined level of program optimization for said executing program is to be performed by a compiler device, said controller generating a compilation plan in accordance with a determined level of optimization; and,
   a recompilation sub-system means for receiving a compilation plan from said controller and invoking a compiler device for recompiling said computer program to thereby attain said predetermined level of program optimization of said executing program in accordance with said compilation plan.

2. The system as claimed in claim 1, wherein said runtime measurements sub-system comprises one or more organizer devices for processing said raw profile data and characterizing said data as meeting a hotness threshold of activity.

3. The system as claimed in claim 2, wherein said runtime measurements sub-system further comprises:
   a mechanism for counting a number of samples that are taken from the executing program; and, a mechanism for comparing the number of samples to a predetermined sampling size threshold, and in response to the member of samples exceeding said sampling threshold, invoking said organizer device to process said raw profile data.

4. The system as claimed in claim 3, wherein said raw profile data samples relate to one or more method activations in said executing program.

5. The system as claimed in claim 4, wherein said organizer device comprises a mechanism for comparing said raw profile data of method activations against a corresponding activity hotness threshold for one or more methods, and identifying one or more methods as meeting said activity hotness threshold for input to said controller device.

6. The system as claimed in claim 3, wherein said controller device adaptively adjusts said sampling size threshold.

7. The system as claimed in claim 4, wherein a level of program optimization includes recompiling an executing method, said controller device further comprising mechanism for adapting said sampling size threshold in accordance with an amount of recompilation that occurs.

8. The system as claimed in claim 2, wherein said controller device dynamically adjusts said activity hotness threshold to adapt to a current behavior of the executing computer program.

9. The system as claimed in claim 4, wherein said controller instructs the recompilation subsystem to insert intrusive profiling for one or more identified methods.

10. The system as claimed in claim 4, wherein a compilation plan generated by said controller device comprises an identifier of a method to be optimized; and, an optimization level indicating a degree of optimization to be applied for said identified method.

11. The system as claimed in claim 4, wherein a level of program optimization includes recompiling an executing method, said controller device including a mechanism for identifying a recompilation level that minimizes expected future running time of a recompiled program.

12. The system as claimed in claim 11, wherein said mechanism for identifying a recompilation level includes:
   mechanism for determining an expected time $T_i$ the program will spend executing a method "m" if said method is not recompiled;
   mechanism for determining a cost $C_j$ of recompiling said method at an optimization level "j", for $i \leq j \leq N$; and,
   mechanism for determining an expected time $T_j$ the program will spend executing said method in the future, if said method is recompiled at level "j"; and,
   comparison mechanism for evaluating the expression $C_j+T_j<T_i$, whereby said controller device decides to one of: generate compilation plan for directing recompilation of "m" at level "j" if said expression is true, and, not recompile if said expression is false.

13. The system as claimed in claim 1, wherein said raw profile data samples are taken at method prologue and back edge yield points.

14. The system as claimed in claim 1, wherein said controller instructs the recompilation subsystem to perform online feedback-directed optimizations based on feedback from the current executing program.

15. The system as claimed in claim 14, wherein said raw profile data samples relate to call context information associated with methods called by said program, said feedback comprising said call context information.

16. The system as claimed in claim 14, wherein said raw profile data samples relate to current program variable values, said feedback comprising a subset of values assigned to said variables during program execution.

17. The system as claimed in claim 14, wherein said raw profile data samples relate to control flow execution within a method, said feedback comprising execution frequency of control flow paths within said executing method.

18. The system as claimed in claim 1, wherein said execution environment includes an interpreter device.

19. A method for adaptively optimizing a computer program executing in a virtual machine execution environment, said virtual machine execution environment comprising one or more compiler devices for providing various levels of program optimization, said method comprising:
   a) during program executing, identifying instances of yield points previously inserted at distinguished locations in said computer program, each said yield point indicating a potential sampling operation during execution of said computer program;
   b) in response to an identified yield point instance, ascertaining a state of said execution environment for indicating whether a sampling operation is to be performed; and
   c) when a state of said execution environment indicates a sampling operation, performing a sampling operation of said executing program including collecting said raw profile data used in characterizing behavior of said execution environment, whereby sampling operations performed at yield points occur at a subset of the executions of yield points;
   d) characterizing said raw profile data as meeting a threshold criteria;
   e) analyzing said characterized raw profile data for determining whether a predetermined level of program optimization for said executing program is to be performed by a compiler device, and generating a compilation plan in accordance with said predetermined level of optimization; and,
   f) when optimization is to be performed, invoking a compiler device for optimizing said executing program in accordance with said compilation plan.

20. The method as claimed in claim 19, wherein said characterizing step d) comprises: processing said raw profile data to determine whether said data meets an activity hotness threshold.

21. The method as claimed in claim 20, wherein said sampling operation includes the steps of:
   counting said samples that are taken from the executing program; and,
   comparing the amount of samples taken to a predetermined sampling size threshold, whereby in response to an amount of samples exceeding said sampling threshold, performing said characterizing step.

22. The method as claimed in claim 21, wherein said raw profile data sampled relates to one or more method activations in said executing program.

23. The method as claimed in claim 22, wherein said step of processing said raw profile data comprises the steps of:
   comparing said raw profile data of method activations against said corresponding activity hotness threshold for one or more methods; and
   identifying one or more methods as meeting said activity hotness threshold.

24. The method as claimed in claim 21, further including the step of adaptively adjusting said sampling size threshold.

25. The method as claimed in claim 22, wherein said step of optimizing includes recompiling an executing method meeting an activity hotness threshold, said method further including the step of adapting said sampling size threshold in accordance with an amount of recompilation that occurs.

26. The method as claimed in claim 22, further including the step of dynamically adjusting said activity hotness threshold for adapting to a current behavior of the executing computer program.

27. The method as claimed in claim 26, wherein said step of dynamically adjusting said activity hotness threshold further includes the steps of:
- determining an amount of methods characterized as meeting said threshold criteria after one or more sampling periods;
- comparing said amount to a limit; and,
- in response to said comparing, one of: decreasing said activity hotness threshold if said limit is not met, and increasing the threshold if said limit is met or exceeded in said one or more sampling periods.

28. The method as claimed in claim 22, further including the step of inserting intrusive profiling for one or more identified methods.

29. The method as claimed in claim 24, wherein said step of generating a compilation plan includes: providing an identifier of said method to be optimized; and, an optimization level indicating a degree of optimization to be applied for said identified method.

30. The method as claimed in claim 22, wherein said analyzing step e) further includes identifying a recompilation level that minimizes expected future running time of a recompiled version.

31. The method as claimed in claim 30, wherein said step of identifying a recompilation level includes the steps of:
- determining an expected time $T_i$ the program will spend executing a method "m" if said method is not recompiled;
- determining a cost $C_j$ of recompiling said method at an optimization level "j", for $i \leq j \leq N$; and,
- determining an expected time $T_j$ the program will spend executing said method in the future, if said method is recompiled at level "j"; and,
- evaluating the expression $C_j + T_j < T_i$, and, one of: recompiling "m" at level "j" if said expression is true, and, not recompiling if said expression is false.

32. The method as claimed in claim 19, wherein said optimizing step further comprises the step of performing online feedback-directed optimizations based on feedback from the current executing program.

33. The method as claimed in claim 32, wherein said raw profile data samples relate to call context information associated with methods called by said program, said feedback comprising said call context information.

34. The method as claimed in claim 32, wherein said raw profile data samples relate to current program variable values, said feedback comprising a subset of values assigned to said variables during program execution.

35. The method as claimed in claim 32, wherein said raw profile data samples relate to control flow execution within a method, said feedback comprising execution frequency of control flow paths within said executing method.

36. The method as claimed in claim 19, wherein said execution environment includes an interpreter device.

37. A computer program product comprising a computer readable medium having recorded thereon a computer program which, when loaded in a computer, configures a computer for adaptively optimizing a computer program executing in a virtual machine execution environment, said virtual machine execution environment comprising one or more compiler devices for providing various levels of program optimization, said computer program executing method steps comprising:
- a) during program execution, identifying instances of yield points previously inserted at distinguished locations in said computer program, each said yield point indicating a potential sampling operation during execution of said computer program;
- b) in response to an identified yield point instance, ascertaining a state of said execution environment for indicating whether a sampling operation is to be performed; and,
- c) when a state of said execution environment indicates a sampling operation, performing a sampling operation of said executing program including collecting said raw profile data used in characterizing behavior of said execution environment, whereby sampling operations performed at yield points occur at a subset of the executions of yield points;
- d) characterizing said raw profile data as meeting a threshold criteria;
- e) analyzing said characterized raw profile data for determining whether a predetermined level of program optimization for said executing program is to be performed by a compiler device, and generating a compilation plan in accordance with said predetermined level of optimization; and,
- f) when optimization is to be performed, invoking a compiler device for optimizing said executing program in accordance with said compilation plan.

38. The computer program product as claimed in claim 37, wherein said characterizing step d) comprises: processing said raw profile data to determine whether said data meets an activity hotness threshold.

39. The computer program product as claimed in claim 37, wherein said sampling step includes the steps of:
- counting said samples that are taken from the executing program; and,
- comparing the amount of samples taken to a predetermined sampling size threshold, whereby in response to an amount of samples exceeding said sampling threshold, performing said characterizing step.

40. The computer program product as claimed in claim 39, wherein said raw profile data sampled relates to one or more method activations in said executing program.

41. The computer program product as claimed in claim 40, wherein said step of processing said raw profile data comprises the steps of:
- comparing said raw profile data of method activations against said corresponding activity hotness threshold for one or more methods; and
- identifying one or more methods as meeting said activity hotness threshold.

42. The computer program product as claimed in claim 39, further including the step of adaptively adjusting said sampling size threshold.

43. The computer program product as claimed in claim 40, wherein said step of optimizing includes recompiling an executing method meeting an activity hotness threshold, said method further including the step of adapting said sampling size threshold in accordance with an amount of recompilation that occurs.

44. The computer program product as claimed in claim 40, further including the step of dynamically adjusting said activity hotness threshold for adapting to a current behavior of the executing computer program.

45. The computer program product as claimed in claim 44, wherein said step of dynamically adjusting said activity hotness threshold further includes the steps of:
- determining an amount of methods characterized as meeting said threshold criteria after one or more sampling periods;
- comparing said amount to a limit; and,
- in response to said comparing, one of: decreasing said activity hotness threshold if said limit is not met, and increasing the threshold if said limit is met or exceeded in said one or more sampling periods.

46. The computer program product as claimed in claim 40, further including the step of inserting intrusive profiling for one or more identified methods.

47. The computer program product as claimed in claim 42, where said step of generating a compilation plan includes: providing an identifier of said method to be optimized; and, an optimization level indicating a degree of optimization to be applied for said identified method.

48. The computer program product as claimed in claim 40, wherein said analyzing step e) further includes identifying a recompilation level that minimizes expected future running time of a recompiled version.

49. The computer program product as claimed in claim 48, wherein said step of identifying a recompilation level includes the steps of:
- determining an expected time $T_i$ the program will spend executing a method "m" if said method is not recompiled;
- determining a cost $C_j$ of recompiling said method at an optimization level "j", for $i \leq j \leq N$; and,
- determining an expected time $T_j$ the program will spend executing said method in the future, if said method is recompiled at level "j"; and,
- evaluating the expression $C_j + T_j < T_i$, and, one of: recompiling "m" at level "j" if said expression is true, and, not recompiling if said expression is false.

50. The computer program product as claimed in claim 37, wherein said optimizing step further comprises the step of performing online feedback-directed optimizations based on feedback from the current executing program.

51. The computer program product as claimed in claim 50, wherein said raw profile data samples relate to call context information associated with methods called by said program, said feedback comprising said call context information.

52. The computer program product as claimed in claim 50, wherein said raw profile data samples relate to current program variable values, said feedback comprising a subset of values assigned to said variables during program execution.

53. The computer program product as claimed in claim 50, wherein said raw profile data samples related to control floe execution within a method, said feedback comprising execution frequency of control flow paths within said executing method.

54. The computer program product as claimed in claim 37, wherein said execution environment includes an interpreter device.

* * * * *